May 21, 1929.  H. C. HANSON  1,713,827
HEATER WITH REFLECTOR
Filed March 22, 1928    2 Sheets-Sheet 1

May 21, 1929.　　　H. C. HANSON　　　1,713,827
HEATER WITH REFLECTOR
Filed March 22, 1928　　　2 Sheets-Sheet 2

Inventor
Hans C. Hanson
By his Attorneys

Patented May 21, 1929.

1,713,827

UNITED STATES PATENT OFFICE.

HANS C. HANSON, OF ALBERT LEA, MINNESOTA.

HEATER WITH REFLECTOR.

Application filed March 22, 1928. Serial No. 263,700.

This invention relates to a heating device and particularly to a heating device using hydrocarbon fuel, which is self contained and portable and of comparatively small size.

It is often desirable to have some portable heating device which can be used to heat a room or dwelling when the temperature is not real low and when only a comparatively small amount of heat is needed to make the room comfortable. Such heaters are quite useful in the spring and fall and for removing the chill from bedrooms and other rooms when there is no regular heating apparatus.

It is an object of this invention, therefore, to provide a simple and efficient self-contained portable heating device adapted to use a hydrocarbon fuel such as gasoline, having a base portion and a concave reflector adjustably mounted thereon, which reflector has a burner or mantle disposed at its concave side and substantially centrally thereof.

It is another object of the invention to provide a heater adapted to use hydrocarbon fuel having a base constituting a fuel reservoir, a concave reflector pivotally mounted on said base, a mantle disposed centrally of said reflector and at the concave side thereof, together with a tube connecting said reservoir and mantle, which is disposed about the pivot of said reflector and movable therewith.

It is more specifically an object of the invention to provide a heater comprising a base member forming a fuel reservoir, a substantially semi-spherical reflector pivoted to said base about a horiozntal pivot, a mantle centrally carried by said reflector at the concave side thereof, and a tube connecting said reservoir and mantle, said tube extending about said pivot in several convolutions and extending about said mantle.

These and other objects and advantages of the invention will be fully set forth in the following description made in connection with the accompanying drawings, in which like reference characters refer to similar parts throughout the several views and in which:—

Fig. 3 is a vertical section taken on line 3—3 of Fig. 1;

Fig. 4 is a horizontal section taken on line 4—4 of Fig. 2; and

Fig. 5 is a horizontal section taken on line 5—5 of Fig. 1.

Figure 1:
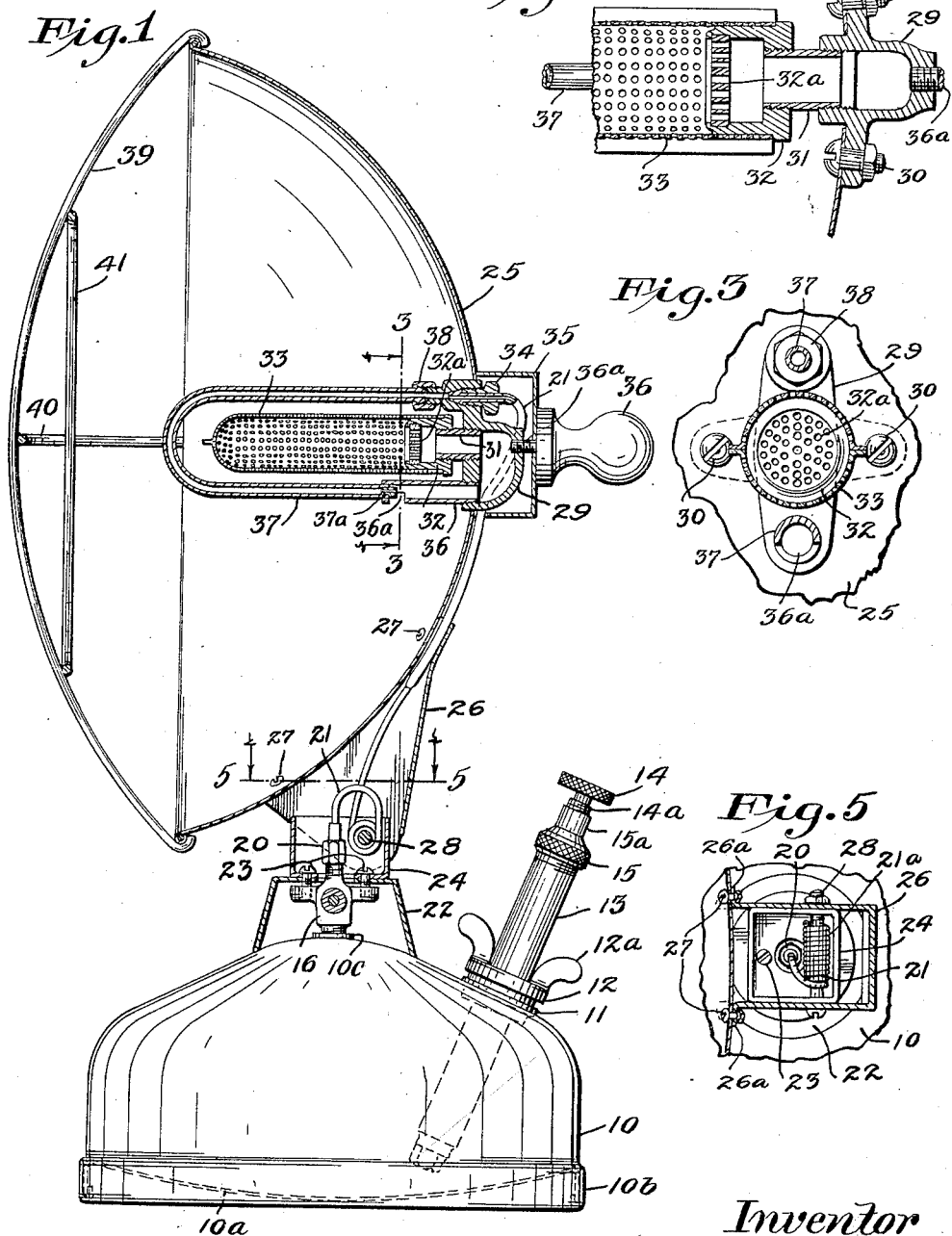
Fig. 1 is a view for the most part in central vertical section of the device, showing the base or fuel reservoir in side elevation.
Figure 2:
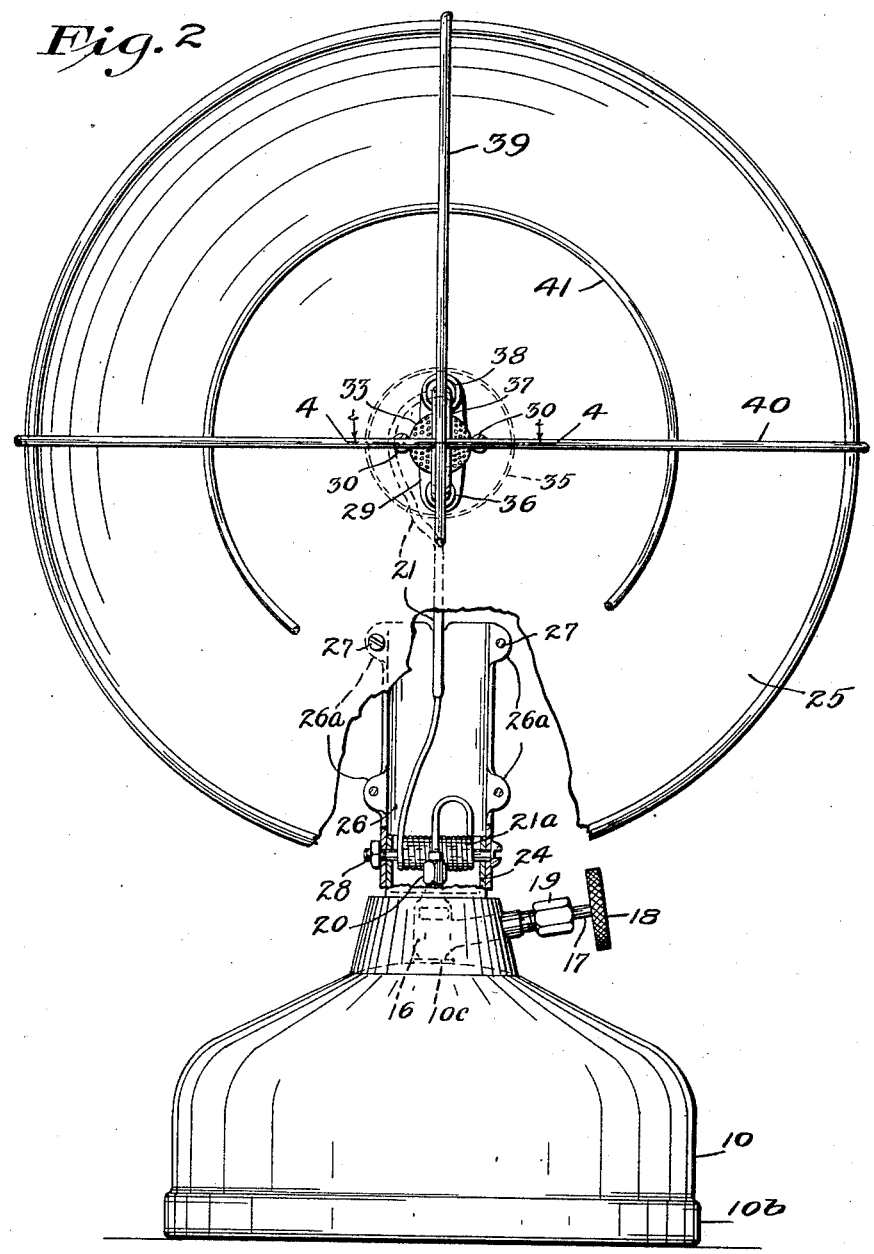
Fig. 2 is a view in front elevation of the device, some parts being broken away and others shown in vertical section.

Referring to the drawings, a device is shown comprising a base member 10 and while this base may be made in various forms, in the embodiment of the invention illustrated it is shown as substantially cylindrical, with a somewhat conical top, and the same is made in the form of a receptacle having a bottom portion 10$^a$ adapted to contain the fuel. Said base is illustrated as having a rib or bead 10$^b$ extending about the bottom portion thereof. The base 10 is also provided with an apertured fitting 11 forming a filling opening which is threaded to receive a closing member 12 having oppositely directed wings or lugs 12$^a$ thereon, by means of which it may be manipulated to be screwed into place. The member 12 has extending therethrough a cylinder 13 which constitutes a pump cylinder, the same extending into the member 10 to a point adjacent the bottom thereof. The member 13 is provided as usual with a plunger (not shown), to which a plunger rod is secured, the upper end of which carries a knurled wheel or handle 14, the upper end of the rod being threaded as shown at 14$^a$ and adapted to be screwed into the reduced end 15$^a$ of a pump cylinder cap 15 when the plunger and plunger rod are not in operation. The plunger cap 15 is screwed onto the upper end of cylinder 13. The pump structure comprising the parts 13, 14 and 15 will be provided with the usual plunger and pump valves, so that air may be forced into the receptacle 10. The receptacle 10 has a threaded boss 10$^c$ at its top central portion, into which is screwed a nipple or fitting 16 constituting a valve seat with which co-operates a needle valve carried on a stem 17 having the knurled operating wheel 18 at its outer end, said stem 17 extending through the packing nuts or fitting 19. The member 16 has a threaded projection at its upper end adapted to receive the coupling member 20 securing thereto the pipe or tube 21. A frusto conical casing 22 surrounds the fitting 16 through which the fitting projects at one side and said casing is secured to oppositely extending lugs on the fitting by the screws 23. The screws 23 also hold in place a casing 24 having an open upper end and which is illustrated as rectangular in form. A reflector 25 is provided, and while this reflector may be made in various forms, as parabolic or otherwise, in the embodiment of the invention illustrated it is shown as substantially semi-spherical. The reflector 25 has secured to its convex side a bracket 26, said bracket having a plurality of lugs $26^a$ through which extend small headed and nutted screws 27 securing the same to the reflector. The bracket 26 has parallel sides embracing the sides of the casing 24, said sides and casing being pivotally connected together by the headed and nutted pivot bolt 28. The reflector 25 has an opening substantially at the center thereof, into which extends a member 29 preferably made as a casing and which is secured to said reflector by small headed and nutted screws 30 passing through oppositely disposed lugs thereon. The member 29 has a threaded aperture in its front portion receiving a small nipple 31, to the front end of which is secured a mantle base 32, on which is frictionally carried the perforated mantle 33. While the various types of mantles might be used, in the embodiment of the invention illustrated a metal mantle is shown, formed of diametrically divided half sections secured together as shown in Fig. 3. The member 32 has the usual perforated plate $32^a$ extending thereacross. The member 29 has a threaded recess in its rear side at its upper portion, adapted to receive a coupling member 34 securing thereto the upper end of the tube 21 which extends downwardly at one side of member 29 into the bracket 26, said tube being disposed about the pivot bolt 28 in quite a number of helical convolutions $21^a$. A cylindrical casing 35 is disposed at the back of the reflector 25, enclosing the member 29 and the upper portion of the tube 21, as well as member 34, which casing is held in place by the knob handle 36 having a threaded stem $36^a$ extending centrally through the rear of casing 35 and threaded into the member 29. The member 29 also has a threaded aperture at its front at the lower portion thereof, into which is threaded the pipe 36, said pipe having an opening $36^a$ formed therein in its lower half, a tube 37 having its open end received in the front end of pipe $36^a$ and being directed axially thereof. A nozzle member or tip $37^a$ is screwed into the end of tube 37 having a small passage therethrough axially alined with pipe 36. The tube 37 is substantially of U-shape, extending about the mantle 33 at the top and bottom thereof, the upper end of the tube being secured to a threaded projection on member 29 by the coupling member 38. Outwardly curved vertical and horizontal wires 39 and 40 respectively extend from the rim of the reflector 25, crossing and being connected substantially at their centers by being soldered together or in any other suitable manner. A circular wire 41 is secured to the wires 39 and 40 and connected thereto by soldering or welding.

In operation the fuel in receptacle 10 will be placed under pressure by operation of the pump plunger 14. The valve wheel 18 and valve stem 17 will be turned to open the valve member 16. A match will be held under the lower portion of tube 37 momentarily to heat the same and fuel passing up into the tube 21 will be vaporized and will pass into the mantle 33 and the mantle will be ignited. The mantle will heat the tube 37 so that the fuel passing therethrough will be continually vaporized and pass into the mantle. It will be seen that the fuel passing through tube 21 passes into the upper end of tube 37, thence to the lower portion thereof and into the tube 36. Air is drawn in through the opening $36^a$ in said latter tube, thus forming a combustible mixture which passes into the member 29 and then through the nipple 31 into the mantle 33. A Bunsen burner is thus formed by the member 36 and the combustible mixture passes out through the perforations in mantle 33 and burns, said mantle being heated to incandescence.

The heat from burner 33 is reflected forwardly from the reflector. The reflector 25 can be adjusted to different positions by the pivot bolt 28, the same being tightened so that said reflector is held in any position to which it is moved. Said reflector can conveniently be adjusted by the handle 36. The wires 39, 40 and 41 act as a guard and prevent anyone brushing against or contacting with the hot mantle and tube 37. The heater will be put out of operation when desired, by closing the valve 17.

From the above description it is seen that applicant has provided a very simple and efficient heating device. The same is quite simple in construction and can be easily and quickly placed in operation. The device is self contained, comparatively light and portable, and can easily be transported for use in any desired place. The same has been amply demonstrated in actual practice, found to be very successful and efficient, and is being commercially marketed.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A heater using hydrocarbon fuel comprising a base member constituting a fuel reservoir, a concave reflector hingedly mounted to said base and movable about a horizontal axis, a gas mantle carried by said reflector at the concave side thereof and projecting substantially centrally thereof, a tube for conducting fuel from said reservoir to said mantle extending about said axis and movable with said reflector and a vaporizing conduit extending about said mantle having one end connected to said mantle and its other end connected to said first mentioned tube.

2. A heater using hydrocarbon fuel comprising a base member constituting a fuel reservoir, a concave reflector hingedly mounted to said base and movable about a horizontal axis, a gas mantle carried by said reflector at the concave side thereof and substantially centrally thereof, a tube for conducting fuel from said reservoir to said mantle, having a number of helical convolutions about said axis and the hinged pivot of said reflector and movable with said reflector and a U-shaped tube extending centrally about said mantle and some distance beyond the free end thereof, said tube communicating with said mantle at one end and with said first mentioned tube at its other end.

3. A heater adapted to use hydrocarbon fuel comprising a base member forming a fuel reservoir, a substantially semi-spherical reflector hingedly mounted on said base to swing about a horizontal axis, said reflector having a member disposed substantially at its central portion having a chamber therein, a gas mantle mounted on said member and projecting forwardly from the concave side of said reflector substantially centrally thereof, the inner side of said mantle communicating with said chamber, a tube extending from said reservoir to said member, and a U-shaped tube extending about the front of said mantle, communicating at one end with said first mentioned tube and at its other end with said chamber.

4. A heater adapted to use hydrocarbon fuel having in combination, a fuel reservoir, a reflector movably mounted on said reservoir having a concave surface, a burner projecting forwardly from said reflector, a conduit connecting said burner and reservoir including a portion extending about said burner, said portion having therein an air inlet, a small apertured nozzle directed toward the portion having said air inlet, whereby a combustible mixture passes to said burner.

5. A heater adapted to use hydrocarbon fuel having in combination, a base member constituting a fuel reservoir, a reflector movably mounted on said base member and having a concave reflecting surface, a member secured to said reflector substantially at the center thereof, having a chamber therein, an elongated hollow burner mounted on said member and projecting forwardly of said reflector, a conduit connecting said chamber and the interior of said reflector, a conduit extending from said reservoir and movable with said reflector, having a portion extending longitudinally about said burner and being connected at one end with said chamber, said latter conduit having an air inlet opening and a small passage adjacent said air inlet opening, whereby a combustible mixture passes through said burner.

6. A heater adapted to use hydrocarbon fuel having in combination, a supporting base comprising a receptacle constituting a fuel reservoir, a valve member secured at the top of said base comprising a manually operable valve for regulating the supply of fuel, an open top casing secured to said valve member, a reflector having a concave front surface disposed above said casing and having spaced plates secured to the rear thereof embracing said casing, a pivot extending through said casing and plate for supporting said reflector, a member carried by said reflector having a chamber therein, a gas mantle secured to said member and projecting substantially axially at the forward side of said reflector and communicating at one end with said chamber, a U-shaped tube secured to said member and extending around the front of said mantle, said tube communicating at one end with said chamber, and a comparatively small tube secured to said valve member extending in a plurality of coils about said pivot and extending upward at the rear of said reflector and communicating with the other end of said U shaped tube, said coils being disposed in said casing.

7. A heater adapted to use hydrocarbon fuel having in combination, a fuel reservoir, a reflector mounted above said reservoir and having a concave front surface, a member secured to the rear of said reflector substantially at the center thereof, a mantle carried by said member and projecting forwardly substantially axially of said reflector, a conduit extending about the front of said mantle and carried by said member, said conduit communicating at one end with said chamber and having an air opening adjacent said end and a tube connected to said fuel reservoir and to the other end of said conduit.

8. A heater using hydrocarbon fuel comprising, a base member constituting a fuel reservoir, a concave reflector oscillatably mounted on said base, a burner carried by said reflector and projecting centrally therefrom, a vaporizing tube extending about said burner connected at one end to said burner and a conduit connecting the other end of said tube to said fuel reservoir, said conduit having a portion movable with said reflector in its oscillating movement.

In testimony whereof I affix my signature.

HANS C. HANSON.